Jan. 28, 1930.  A. W. MARINER  1,744,910
FERTILIZER MIXING HARROW
Filed Jan. 31, 1928   2 Sheets-Sheet 1
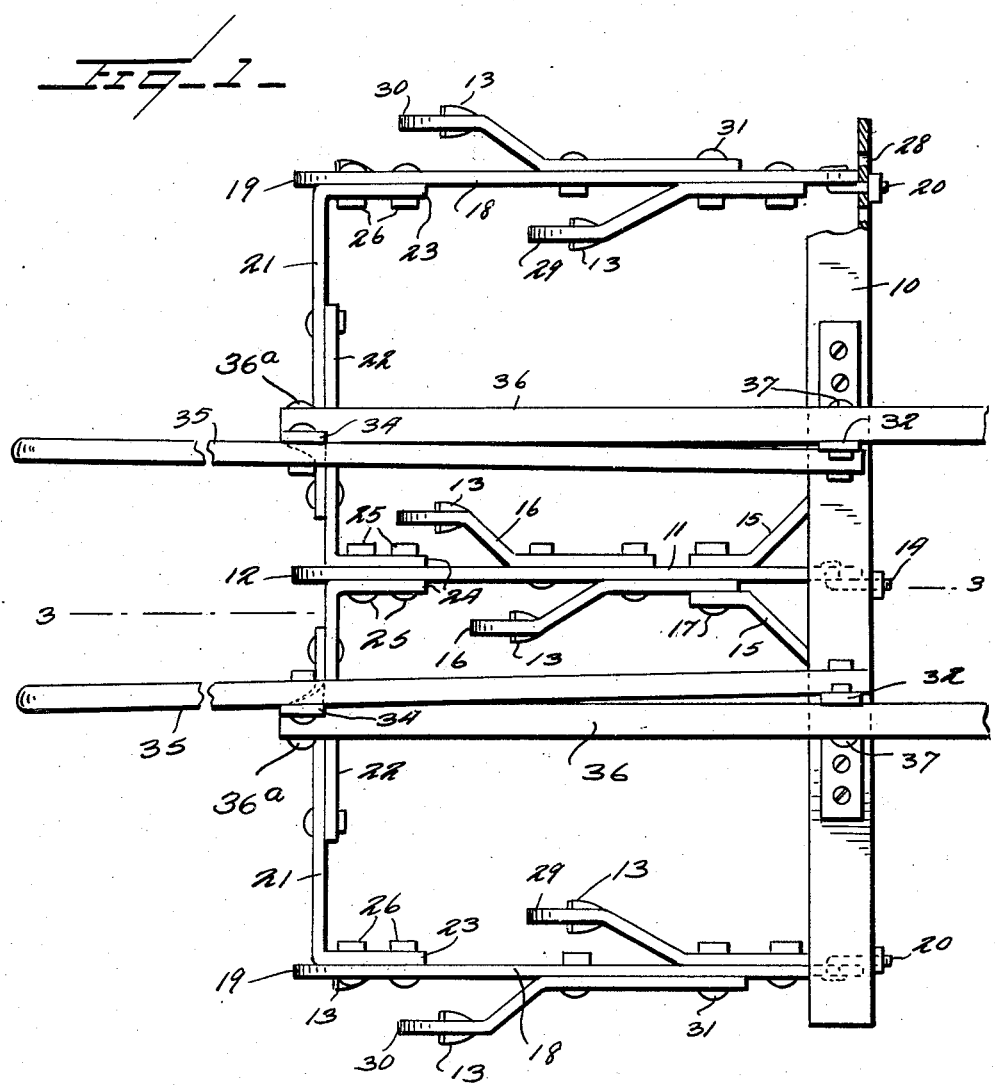
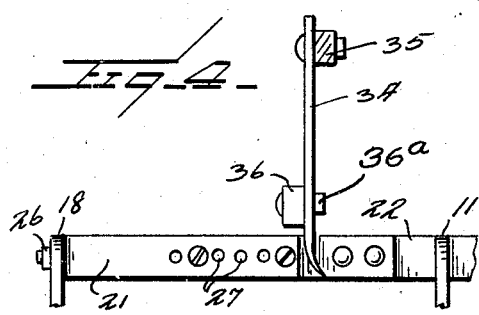
Inventor
A. W. Mariner
By Watson E. Coleman
Attorney Jan. 28, 1930.　　A. W. MARINER　　1,744,910
FERTILIZER MIXING HARROW
Filed Jan. 31, 1928　　2 Sheets-Sheet 2
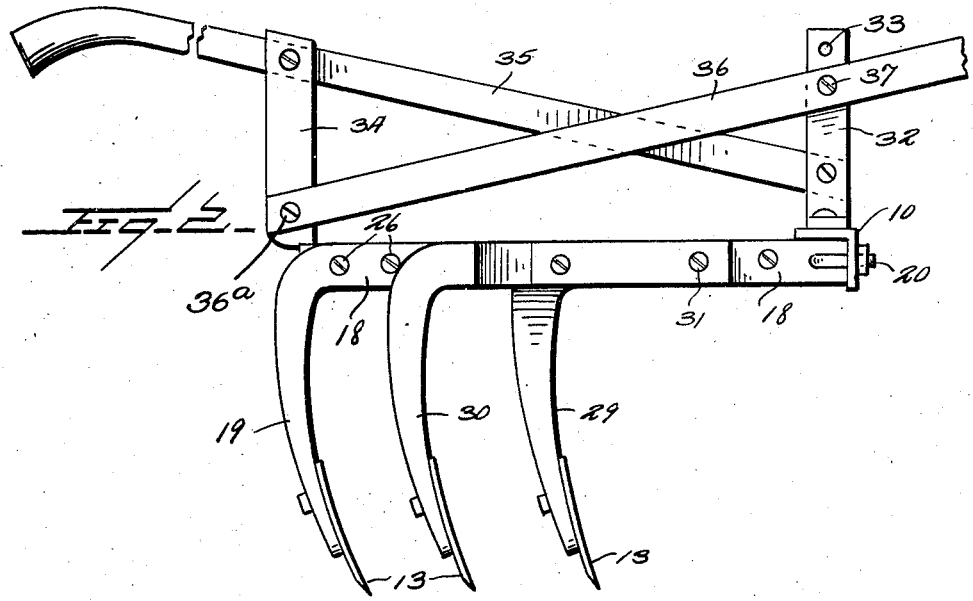
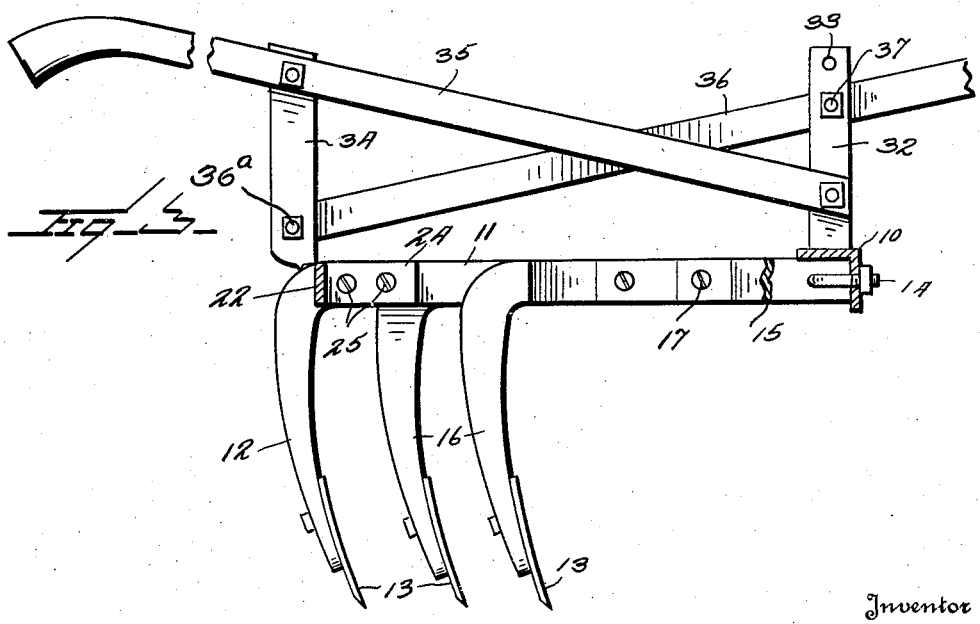
Inventor
A. W. Mariner
By Watson E. Coleman
Attorney Patented Jan. 28, 1930

1,744,910

UNITED STATES PATENT OFFICE

ARCHIE W. MARINER, OF NEW CHURCH, VIRGINIA

FERTILIZER-MIXING HARROW

Application filed January 31, 1928. Serial No. 250,888.

This invention relates to agricultural implements, and particularly to a harrow designed for mixing fertilizer with the soil to keep it from coming in contact with seed or tubers to be afterwards planted.

The general object of the present invention is to provide a draft harrow for this purpose which is guided by hand and which is so constructed that it is laterally adjustable so as to change the width between the teeth in accordance with the width of the rows and bring the harrow teeth nearer to or farther away from each other.

A further object is to provide a device of this kind which may be used either with shafts or a tongue, and further so constructed that the shafts or tongue may be adjusted to change the angle of the plow shanks.

A still further object is to provide a device of this character which is very simple, which may be easily made, and which is effective for the purpose intended.

My invention is illustrated in the accompanying drawings, wherein:—

Figure 1 is a top plan view of a harrow constructed in accordance with my invention;

Figure 2 is a side elevation thereof;

Figure 3 is a longitudinal sectional view thereof on the line 3—3 of Figure 1;

Figure 4 is a fragmentary elevation looking at the front of the harrow, the handle bar being in section.

Referring to these drawings, 10 designates a transverse angle iron having an upper horizontal flange and a forward vertical flange. Attached to the middle of this transversely extending iron is a longitudinally extending iron 11, which at its rear end has a downwardly extending shank 12 and a harrow tooth or point 13 detachably engaged with the shank. This iron 11 at its forward end is connected to the angle iron 10 by means of the angle bolt 14 or in any other suitable manner and is held to the angle iron 10 which constitutes a draft beam by the inwardly converging braces 15, these braces being bolted at their outer ends to the vertical flange of the angle iron 10 and at their inner ends bolted through the shank or iron 11.

Bolted to the iron 11 are a plurality of shanks 16, shown as two in number, one disposed in advance of the other, these shanks being laterally deflected adjacent their outer ends and then extending downward and carrying the cultivator or plow points 13 in the same manner as does the iron or shank 11. The forwardmost shank 16 is extended between one of the braces 15 and the member 11 and is bolted thereto by one of the bolts 17.

Attached in the same manner to the ends of the irons 10 are the longitudinally extending irons 18, which at their rear ends are downwardly extended to form point-supporting shanks 19 carrying the plow points 13, as previously described. These members 18 have the same length as the member 11 and each at its forward end is connected to the transverse angle iron 10 by means of the angular bolts 20.

Extending between each longitudinal member 18 and the member 11 are the two transversely extending frame irons 21 and 22. Each of these is angularly bent at one end, as at 23 and 24. Bolts 25 connect the irons 22 to the longitudinal member 11, while bolts 26 connect the members 21 to the longitudinal members 18. The members 21 and 22 overlap and each is provided with a plurality of bolt holes 27 through which a plurality of bolts may pass whereby these two irons 21 and 22 may be adjusted upon each other and then held in their adjusted positions. The vertical flange of the angle iron 10 is also provided with a plurality of bolt holes 28, through any one of which the angular bolt 20 may pass, and thus the irons 18 with the members 21 may be adjusted nearer to or further from the longitudinal member 11 to thus adjust the width of the machine.

Attached to each of the members 18 are the shanks 29 and 30 which carry the plow points 13. These shanks 29 and 30 are bolted by bolts 31 to the corresponding member 18. One of the plow points or cultivator teeth 13 is disposed behind the other cultivator tooth, and it will be seen that there are thus three teeth disposed at the middle of the machine and three teeth on each side of the machine and that the teeth of each set are disposed one in advance of the other. Any desired form of plow point or cultivator tooth may be detachably mounted upon the lower ends of the downwardly curved shanks.

Attached to the horizontal flange of the angle iron 10 and extending upward therefrom are the supporting irons 32 which are bolted to the horizontal flange and at their upper ends are provided with a plurality of bolt holes 33. Bolted or otherwise attached to the members 22 are the upwardly extending supporting irons 34. Handles 35 are bolted or otherwise attached to the upper ends of the members 34 and extend diagonally downward and forward and at their forward ends are bolted to the braces 32 adjacent the lower ends thereof. As illustrated, shafts 36 are pivoted by bolts 36ª to the lower ends of the members 34 and extend upward and forward and are bolted to the members 32 by bolts or like attaching members 37 which pass through either one of the openings 33. Thus the rear ends of the shafts are pivotally connected at their rear ends so that the forward ends of the shafts may be raised or lowered.

While I have illustrated the device as being provided with a pair of shafts so that one draft animal may be used to draw the cultivator, I do not wish to be limited to this as a tongue may be connected to the members 32 and 34 so that two horses may be applied to the machine to draw it, and this tongue is also adapted to be raised or lowered at its forward end. Thus the angle made by the shanks entering the ground can be changed by lowering or raising the shafts or tongue. This machine, as before stated, is particularly designed for dragging along a row after the row is marked and fertilizer sowed in order to mix the fertilizer with the soil to keep it from killing the potatoes, plants or seeds which may be planted therein. The adjustments described permit the machine to be adjusted to rows of any width desired. Cultivator hoes or teeth of any character may be applied to the downwardly extending shanks.

While I have illustrated a structure which I believe to be particularly effective, I do not wish to be limited thereto as the details of construction may be changed without departing from the spirit of the invention as defined in the appended claims.

I claim:—

1. A fertilizer mixing harrow of the character described comprising a transversely extending forward element, irons extending rearward from the forward element and downwardly extended at their rear ends to support harrow teeth, said irons constituting part of a supporting frame, the outer irons being adjustable toward the middle irons and the rear ends of the outer irons being connected to the rear end of the middle iron, harrow teeth supporting shanks mounted upon said irons forward of their rear ends, handles mounted upon the harrow, and a draft device pivotally mounted upon the rear end of the harrow and extending forward thereof and vertically adjustable at the forward end.

2. A fertilizer mixing harrow comprising a forwardly disposed, transversely extending angle iron, three irons detachably engaged at their forward ends with said angle iron and extending rearward therefrom and then downward and supporting harrow teeth at their lower ends, overlapping irons attached to the middle iron and the lateral irons and transversely adjustable upon each other, the forward ends of the lateral irons being transversely adjustable upon the forward angle iron, harrow teeth supporting shanks attached to said rearwardly extending irons and downwardly extended at their rear ends and carrying cultivator teeth, supports mounted upon the overlapping members and extending upwardly therefrom, handles attached to said supports and at their forward ends operatively supported upon the angle iron, and a draft device pivotally connected to the harrow at the rear thereof and vertically adjustable at its forward end.

3. A fertilizer mixing harrow comprising a forwardly disposed, transversely extending angle iron, three irons detachably engaged at their forward ends with said angle iron and extending rearward therefrom and then downward and supporting harrow teeth at their lower ends, overlapping irons attached to the middle iron and the lateral irons and transversely adjustable upon each other, the forward ends of the lateral irons being transversely adjustable upon the forward angle iron, harrow teeth supporting shanks attached to said rearwardly extending irons and downwardly extended at their rear ends and carrying cultivator teeth, supports mounted opon the overlapping members and extending upwardly therefrom, handles attached to said supports and at their forward ends operatively supported upon the angle iron, shafts pivotally connected at their rear ends to the lower ends of said handle-supporting members, vertical members attached to the forward angle iron, and means whereby the shafts may be vertically adjusted upon said vertical members.

4. A mixing harrow of the character described comprising a transversely extending angle iron, three rearwardly extending irons detachably connected at their forward ends to the angle iron and at their rear ends extending downward to constitute harrow tooth-supporting shanks, overlapping irons each angularly bent at one end, the angular ends of the irons being attached respectively to the outer longitudinally extending irons and the inner longitudinally extending iron, the overlapping ends of said transversely extending irons having a plurality of bolt apertures whereby the irons may be adjusted upon each other, and bolts passing through said apertures, the forward ends of the longitudinally extending irons being adjustably engaged with the transverse angle iron, harrow tooth shanks mounted upon each of the longitudinally extending irons and extending rearwardly and divergently with relation thereto, handle-supporting members mounted upon the overlapping irons and extending upwardly therefrom, vertical supporting members mounted upon the angle iron, handles pivotally connected to the handle-supporting members and to said vertical members at the lower ends thereof, the vertical members having a plurality of apertures adjacent their upper ends, and shafts pivotally mounted upon the handle-supporting members at their rear ends and having bolts engageable in any one of the apertures of said vertical members.

In testimony whereof I hereunto affix my signature.

ARCHIE W. MARINER.